(12) United States Patent
Akkarakaran et al.

(10) Patent No.: US 10,064,215 B2
(45) Date of Patent: Aug. 28, 2018

(54) ENHANCED TRANSMISSION OF CONTROL CHANNEL SIGNALING OVER UMTS

(71) Applicant: QUALCOMM Incorporated, San Diego, CA (US)

(72) Inventors: Sony Akkarakaran, Poway, CA (US); Arjun Bharadwaj, San Diego, CA (US); Peyman Razaghi, San Diego, CA (US); Sharad Deepak Sambhwani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 355 days.

(21) Appl. No.: 14/801,621

(22) Filed: Jul. 16, 2015

(65) Prior Publication Data

US 2016/0095138 A1 Mar. 31, 2016

Related U.S. Application Data

(60) Provisional application No. 62/056,283, filed on Sep. 26, 2014.

(51) Int. Cl.
*H04B 7/216* (2006.01)
*H04W 74/00* (2009.01)
(Continued)

(52) U.S. Cl.
CPC ......... *H04W 74/002* (2013.01); *H04L 5/0044* (2013.01); *H04L 5/0053* (2013.01); *H04L 5/0082* (2013.01); *H04L 5/0094* (2013.01); *H04W 28/0252* (2013.01); *H04W 52/0216* (2013.01); *H04W 76/28* (2018.02);
(Continued)

(58) Field of Classification Search
CPC .................................................. H04W 74/002
See application file for complete search history.

(56) References Cited

U.S. PATENT DOCUMENTS

| 6,747,963 | B1 | 6/2004 | Park et al. | |
|---|---|---|---|---|
| 2006/0256757 | A1* | 11/2006 | Kuusela | H04W 76/048 370/335 |
| 2007/0030839 | A1* | 2/2007 | Vimpari | H04W 28/06 370/342 |

FOREIGN PATENT DOCUMENTS

| EP | 1 206 855 A1 | 5/2002 |
|---|---|---|
| WO | WO-00/62456 A1 | 10/2000 |

OTHER PUBLICATIONS

International Search Report and Written Opinion—PCT/US2015/050427—ISA/EPO—dated Dec. 8, 2015. (11 total pages).

* cited by examiner

*Primary Examiner* — Maharishi Khirodhar
*Assistant Examiner* — Angel Brockman
(74) *Attorney, Agent, or Firm* — Arent Fox, LLP

(57) ABSTRACT

Aspects are described for modifying transmission of control channel signaling during wireless communication. The described aspects include detecting a communication condition corresponding to signaling information transmitted on a Dedicated Channel (DCH); determining whether a Dedicated Physical Data Channel (DPDCH) is transmitted based on detecting the communication condition; and performing a Dedicated Physical Control Channel (DPCCH) gating pattern in response to the determination that the DPDCH is not transmitted, wherein performing the DPCCH gating pattern includes intermittently transmitting the DPCCH when one or more signaling radio bearers (SRBs) are not being transmitted.

25 Claims, 6 Drawing Sheets

(51) Int. Cl.
  *H04L 5/00* (2006.01)
  *H04W 28/02* (2009.01)
  *H04W 52/02* (2009.01)
  *H04W 76/28* (2018.01)
  *H04W 72/12* (2009.01)
  *H04W 74/08* (2009.01)

(52) U.S. Cl.
  CPC ........ *H04W 72/12* (2013.01); *H04W 74/0816* (2013.01); *Y02D 70/00* (2018.01); *Y02D 70/1222* (2018.01); *Y02D 70/1242* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01); *Y02D 70/24* (2018.01); *Y02D 70/25* (2018.01)

ENHANCED TRANSMISSION OF CONTROL CHANNEL SIGNALING OVER UMTS

CLAIM OF PRIORITY UNDER 35 U.S.C § 119

The present Application for Patent claims priority to U.S. Provisional Application No. 62/056,283 entitled "ENHANCED TRANSMISSION OF CONTROL CHANNEL SIGNALING OVER R99 UMTS" filed Sep. 26, 2014, assigned to the assignee hereof and hereby expressly incorporated herein by reference.

BACKGROUND

Aspects of the present disclosure relate generally to wireless communication systems, and more particularly, to modify transmission of control channel signaling during wireless communication.

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

In some wireless communication networks, inefficient and/or ineffective utilization of available communication resources, particularly data transmission on the uplink, may lead to degradations in wireless communication. Even more, the foregoing inefficient resource utilization inhibits user equipments and/or wireless devices from achieving higher wireless communication quality. Thus, improvements in modifying transmission of control channel signaling during wireless communication are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, the present methods relate to modifying transmission of control channel signaling during wireless communication. The described aspects include detecting a communication condition corresponding to signaling information transmitted on a Dedicated Channel (DCH); determining whether a Dedicated Physical Data Channel (DPDCH) is transmitted based on detecting the communication condition; and performing a Dedicated Physical Control Channel (DPCCH) gating pattern in response to the determination that the DPDCH is not transmitted, wherein performing the DPCCH gating pattern includes intermittently transmitting the DPCCH when one or more signaling radio bearers (SRBs) are not transmitted.

In another aspect, a computer-readable medium storing computer executable code relates to code for modifying transmission of control channel signaling during wireless communication. The described aspects include code for detecting a communication condition corresponding to signaling information transmitted on a DCH; code for determining whether a DPDCH is transmitted based on detecting the communication condition; and code for performing a DPCCH gating pattern in response to the determination that the DPDCH is not transmitted, wherein code for performing the DPCCH gating pattern includes code for intermittently transmitting the DPCCH when one or more SRBs are not transmitted.

In a further aspect, an apparatus relates to modifying transmission of control channel signaling during wireless communication. The described aspects include means for detecting a communication condition corresponding to signaling information transmitted on a DCH; means for determining whether a DPDCH is transmitted based on detecting the communication condition; and means for performing a DPCCH gating pattern in response to the determination that the DPDCH is not transmitted, wherein performing the DPCCH gating pattern includes intermittently transmitting the DPCCH when one or more SRBs are not transmitted.

In another aspect, an apparatus relates to modifying transmission of control channel signaling during wireless communication. The described aspects include a signal detecting component configured to detect a communication condition corresponding to signaling information transmitted on a DCH; a data transmission determining component configured to determine whether a DPDCH is transmitted based on detecting the communication condition; and a gating component configured to perform a DPCCH gating pattern in response to the determination that the DPDCH is not transmitted, wherein the performing component is further configured to intermittently transmit the DPCCH when one or more SRBs are not transmitted.

Various aspects and features of the disclosure are described in further detail below with reference to various examples thereof as shown in the accompanying drawings. While the present disclosure is described below with reference to various examples, it should be understood that the present disclosure is not limited thereto. Those of ordinary skill in the art having access to the teachings herein will recognize additional implementations, modifications, and examples, as well as other fields of use, which are within the scope of the present disclosure as described herein, and with respect to which the present disclosure may be of significant utility.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout, where dashed lines may indicate optional components or actions, and wherein.

DETAILED DESCRIPTION

Figure 1:
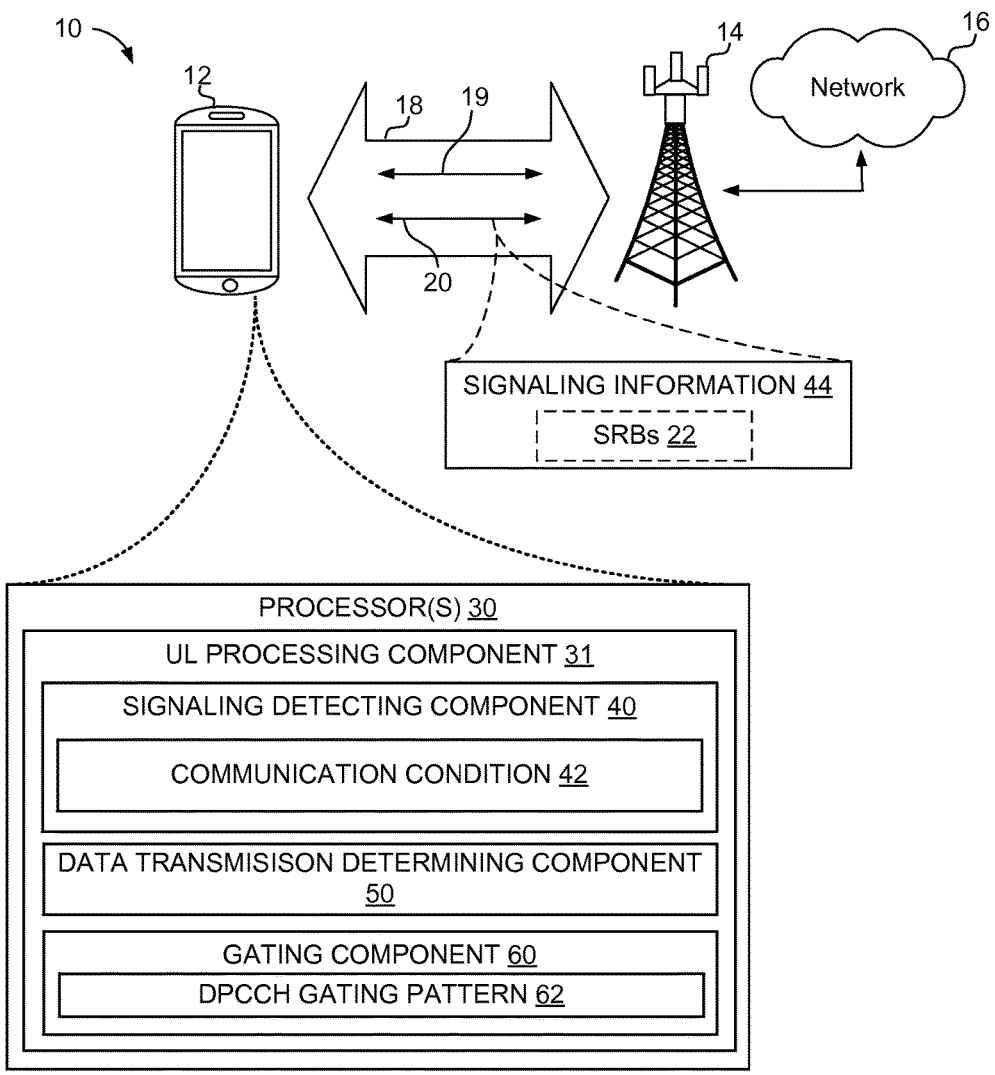
FIG. 1 is a schematic diagram illustrating an example of a wireless communication system, including aspects of the present disclosure relating to a user equipment (UE) performing enhanced control channel signalling when only signalling information is transmitted on an uplink channel.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts. In an aspect, the term "component" as used herein may be one of the parts that make up a system, may be hardware or software, and may be divided into other components.

The present aspects generally relate to enhanced control channel signalling when only signalling information is transmitted on a dedicated channel (DCH). For example, HSPA networks may use the DCH to transmit upper-layer control channel signaling (e.g., signaling radio bearers (SRBs)) for greater reliability, while data is being transmitted on High-Speed Downlink Packet Access (HSDPA) and enhanced uplink (EUL) channels. In an aspect, if the DCH also carries voice traffic, then significant improvements in UE battery life may be accomplished by enabling discontinuous transmission (DTX) and discontinuous reception (DRX) opportunities during the circuit-switched DCH transmission, and enabling HSPA continuous packet connectivity (CPC) operation together with the DCH transmission. However, in situations where the DCH channel carries only SRBs without voice traffic, the intermittent nature of the SRB traffic can be further exploited to yield more savings both in link-efficiency and battery life.

In an aspect, the physical-layer Dedicated Physical Control Channel (DPCCH) channel, carrying pilots, transmit power control (TPC) and possibly Transport Format Combination Indicator (TFCI) bits, may be transmitted in every time slot, except in compressed-mode gaps. DPCCH is needed for power-control and possibly also for demodulation of DCH. In an aspect, DPCCH may not need to be transmitted on every time slot, thus enabling DTX and DRX even when voice traffic is being transmitted (e.g., where DCH carries both voice traffic and SRBs). During a voice call, transport blocks associated with voice traffic are generated in intervals (e.g., every 20 ms), thus, the amount of DTX and DRX gaps that may be created in this manner is limited, since the DPCCH is needed to support these voice packets. However, when the DCH carries only SRBs, the DCH coded composite transmit channel (CCTrCh) has only two possible transport-format combinations: SRBs being transmitted or SRBs not being transmitted. In certain configurations, for example, the Dedicated Physical Data Channel (DPDCH) is DTXed when the SRB is not transmitted. Further, the SRBs are intermittent, thus there may be periods of time (e.g., hundreds of SRB TTIs) in which only DPCCH is being transmitted. Thus, even these DCH-enhancements will still result in DPCCH being transmitted in far more slots than may be necessary.

Accordingly, in some aspects, the present methods and apparatuses may provide an efficient solution, as compared to current solutions, by enabling a UE to enhance control channel signalling when only signalling information is transmitted on a DCH. In other words, in the present aspects, a UE may modify transmission of control channel signaling during wireless communication in order to save transmission power and reduce interference. As such, the present aspects provide one or more mechanisms for detecting a communication condition corresponding to signaling information transmitted on a DCH; determining whether a DPDCH is transmitted based on detecting the communication condition; and performing a DPCCH gating pattern in response to the determination that the DPDCH is not transmitted, wherein performing the DPCCH gating pattern includes intermittently transmitting the DPCCH when one or more SRBs are not transmitted.

Referring to FIG. 1, in an aspect, a wireless communication system 10 includes at least one UE 12 in communication coverage of at least one network entity 14 (e.g., base station), where UE 12 includes an uplink (UL) processing component 31 running on processor 30 that can modify transmission of control channel signaling during wireless communication. For instance, UE 12 may have relatively small amounts of bursty data for uplink transmission to network 16 via network entity 14, and UL processing component 31 enables UE 12 to reduce control channel signaling in the absence of data transmissions. In an example, UE 12 may transmit and/or receive wireless communication to and/or from network entity 14 via one or more communication channels 18, such as but not limited to a DCH, which may include a data communication channel 19, such as but not limited to an DPDCH, and a control communication channel 20, such as but not limited to a DPCCH. Such wireless communications may include, but are not limited to, voice traffic and/or data traffic on data communication channel 19, and signaling information 44 (e.g., including SRBs 22) and/or control signaling on control communication channel 20.

In an aspect, UE 12 may include one or more processor(s) 30, which may include UL processing component 31 implemented as one or more processor modules, or which may be in communication with a computer-readable medium storing computer-readable code that, when executed by the one or more processor(s) 30, implements UL processing component 31.

As noted, UL processing component 31 is configured to modify transmission of control channel signaling during wireless communication in order to save transmission power and reduce interference. Specifically, in an aspect, one or more processor(s) 30 may execute UL processing component 31 and/or a signaling detecting component 40, which may be configured to detect a communication condition 42 corresponding to presence of signaling information 44 transmitted on communication channel 18, e.g., DCH. In an aspect, for example, UL processing component 31 and/or signaling detecting component 40 may detect that only signaling information 44 (e.g., one or more SRBs) is transmitted on control communication channel 20. Moreover, UL processing component 31 and/or signaling detecting component 40 may detect that the communication condition 42 corresponds to a condition where only the signaling information 44 is transmitted on communication channel 18, such as but not limited to the DCH, without any concurrent transmission of voice and/or data traffic on data communication channel 19.

Further, in an aspect, one or more processor(s) 30 and/or UL processing component 31 may include a data transmission determining component 50, which may be configured to determine whether a DPDCH 19 is transmitted. In an aspect, the operation of signaling detecting component 40 detecting the communication condition 42 is based on data transmission determining component 50 determining whether data communication channel 19, e.g., DPDCH, is transmitted. In an alternative aspect, the operation of data transmission determining component 50 is based on signaling detecting component 40 detecting the communication condition 42, e.g., presence of signaling information 44 transmitted on communication channel 18, e.g., DCH. In any case, as stated, in one aspect the communication condition 42 may correspond to a condition where only the signaling information 44 (e.g., SRBs 22) is transmitting on the DCH (e.g., communication channel 18) without voice and/or data traffic on data communication channel 19. For example, UL processing component 31 and/or data transmission determining component 50 may be configured to determine whether one or more SRBs 22 are currently being transmitted on the DCH in order to determine whether data communication channel 19, e.g., the DPDCH, is being transmitted. The UL processing component 31 and/or data transmission determining component 50 may base this determination on the basis that when the DCH carries only SRBs, the DCH Coded Composite Transmit Channel (CCTrCH) has only two possible transport-format combinations: SRBs being transmitted or SRBs not being transmitted. In an aspect, data communication channel 19, e.g., the DPDCH, may be discontinuously transmitted (DTXed), e.g., not transmitted in certain instances, such as when SRB 22 is not transmitted. As such, for example, when the SRBs 22 are not being transmitted, then UL processing component 31 and/or data transmission determining component 50 may determine that data communication channel 19, e.g., the DPDCH, is not being transmitted. Otherwise, for example, when the SRBs 22 are being transmitted then UL processing component 31 and/or data transmission determining component 50 may determine that data communication channel 19, e.g., the DPDCH, is being transmitted.

In another aspect, the one or more processor(s) 30 and/or UL processing component 31 may include a gating component 60, which may be configured to perform or otherwise apply a DPCCH gating pattern 62 to control communication channel 20, in response to the determination that data communication channel 19, e.g., the DPDCH, is not transmitted. For example, DPCCH gating pattern 62 may be defined as a pattern of blocking (e.g., discontinuous transmission or DTX) or allowing a DPCCH transmission within one or more portions, e.g., including but not limited to slots, of a TTI. In an aspect, for example, gating component 60 may perform the DPCCH gating pattern 62 by causing intermittent transmitting of control communication channel 20, e.g., the DPCCH, when one or more SRBs are not transmitted. In an aspect, for example, UL processing component 31 and/or gating component 60 may be configured to perform discontinuous transmission (DTX) of control communication channel 20, e.g., the DPCCH, during one or more transmission time intervals (TTIs) when it is determined that the DPDCH 19 is not transmitted. Further, in an aspect, for example, performing DTX of control communication channel 20, e.g., the DPCCH, during the one or more TTIs may include transmitting control communication channel 20, e.g., the DPCCH, over a first portion of a SRB transmission interval.

Figure 2:
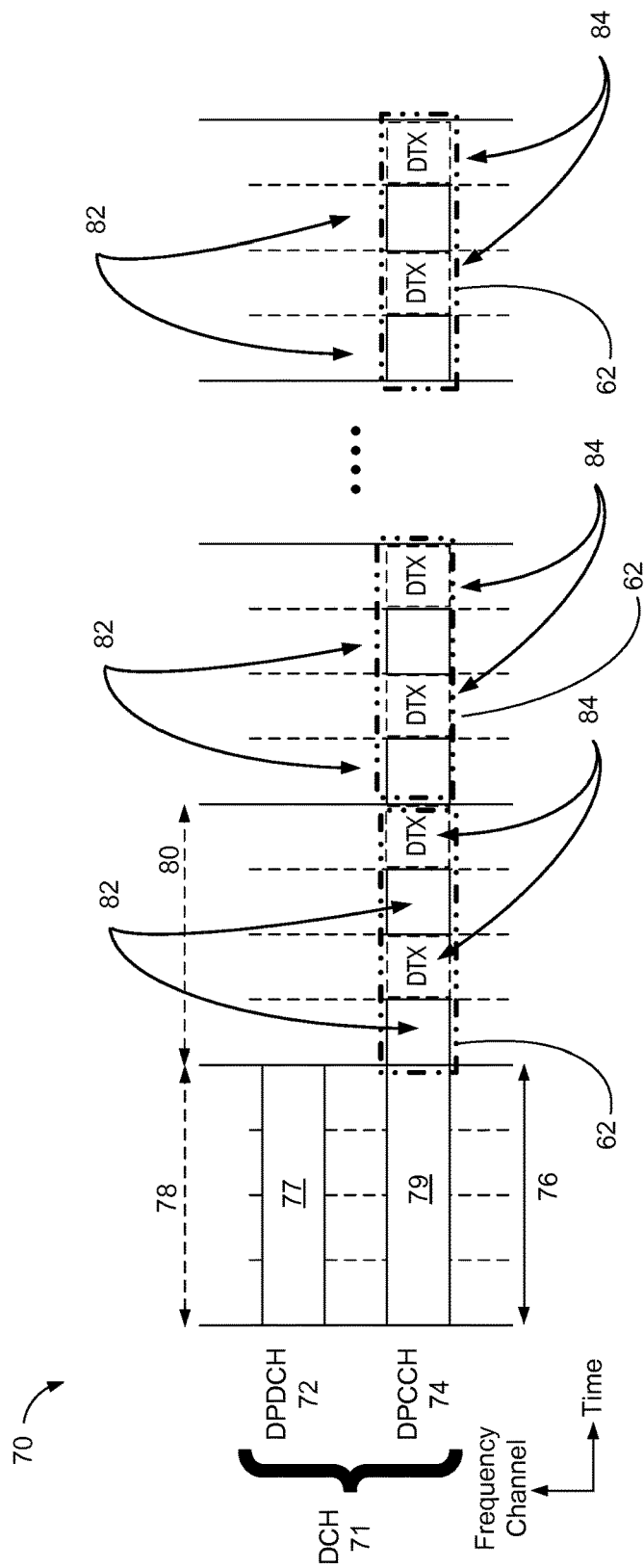
FIGS. 2 and 3 are conceptual diagrams of transmission schemes that may be utilized by the UE illustrating an example of the aspects of enhanced control channel signalling when only signalling information is transmitted on an uplink channel as described in the present disclosure.
Figure 3:
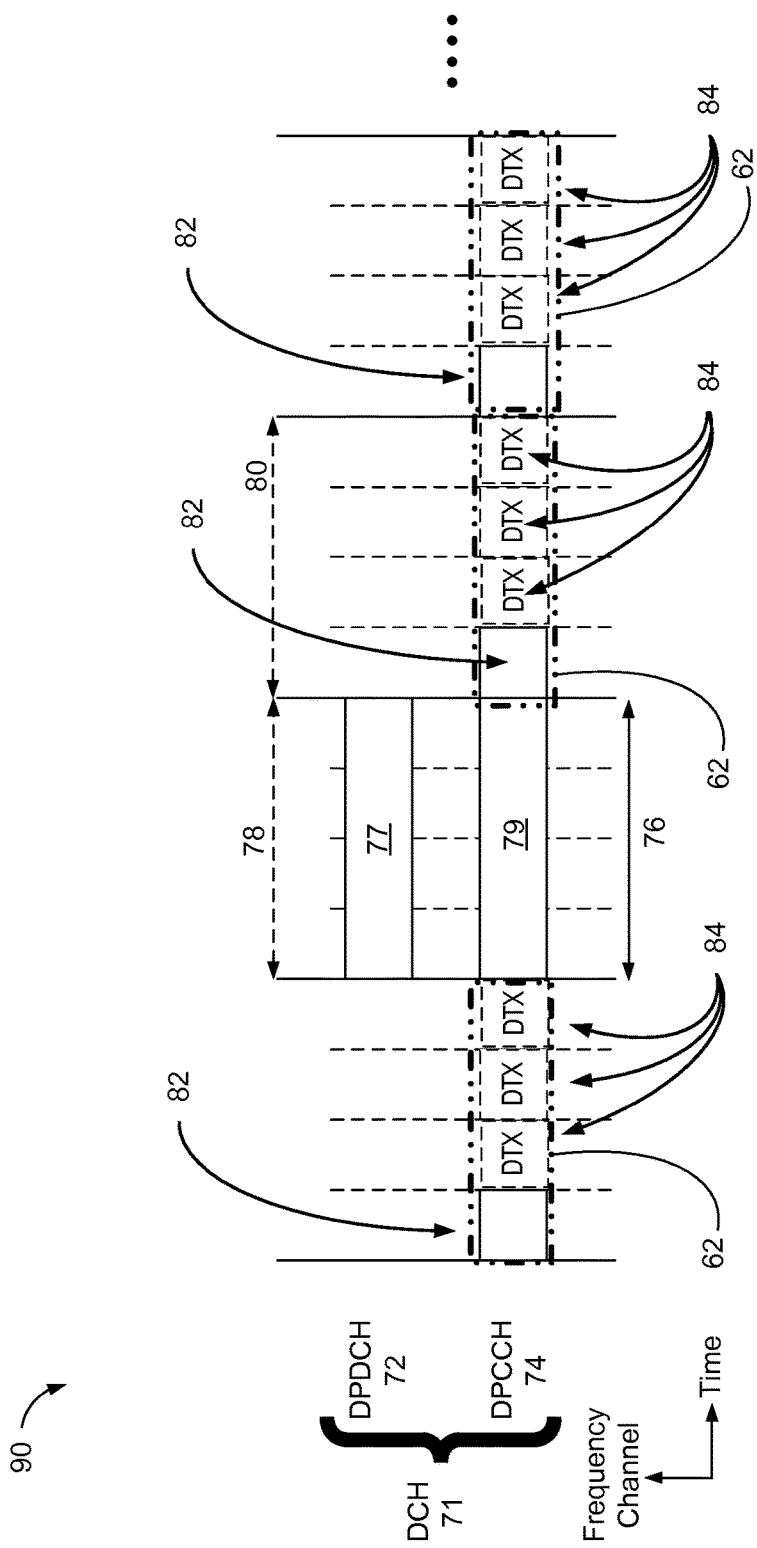

For example, in a specific use case that should not be construed as limiting, referring to FIGS. 2 and 3, the operation of UL processing component 31 executing gating component 60 on control communication channel 20, e.g., the DPCCH, may be represented by transmission schemes 70 and 90, respectively, for enhanced control channel signalling by a user equipment to a network entity, such as a base station, when only signalling information is transmitted on an uplink channel. More specifically, FIGS. 2 and 3 depict DPCCH discontinuous transmission by a user equipment when SRBs are only being transmitted over the DCH. Transmission schemes 70 and 90 may be performed by UE 12, such as via execution of UL processing component 31 and/or DL processing component 32 as described above.

Referring to FIG. 2, transmission scheme 70 may be used by UE 12 to transmit over a DCH 71, such as communication channel 18 (FIG. 1), which includes a data channel, e.g., DPDCH 72, and a control channel, e.g., DPCCH 74. For example, DPDCH 72 and DPCCH 74 may be physical data and control channels, respectively, providing uplink and downlink communication between a UE, such as UE 12 (FIG. 1) and a network entity, such as network entity 14. In an aspect, UE 12 may use DPDCH 72 and DPCCH 74 to transmit signals within one or more transmission time intervals (TTIs) over time. In an example, which should not be construed as limiting, each TTI may be 40 ms in length (e.g., length 76). For example, UE 12 may transmit data 77 over DPDCH 72 across the entire first TTI 78 while concurrently transmitting control signaling 79, e.g., including one or more SRBs, over DPCCH 74 in the first TTI 78. However, where SRBs (such as SRBs 22 of FIG. 1) are only transmitted on the DPCCH 74 of the DCH 71 and there is no voice or other data traffic on DPDCH 72, e.g., during second TTI 80 and the subsequent TTIs illustrated in FIG. 2, then SRB transmission 82 on DPCCH 74 may be discontinuous, e.g., may include discontinuous transmission periods where no SRB transmission occurs, indicated as DTX 84. In this example, for instance, if TTI 80 is 40 ms in length, then SRB transmission 82 may occur during 20 ms of the 40 ms TTI 80, e.g., during two 10 ms periods within the TTI, where the two 10 ms periods may be separated by DTX 84 (as illustrated) or may be adjacent. As such, in this aspect, a 50% DTX/DRX gain may be observed, e.g., UE 12 may save 50% in power consumption by not transmitting SRB 82 on DPCCH 74 and other UEs or network entities, such as network entity 14, may experience a 50% reduction in received interfering signals.

Referring to FIG. 3, an alternative transmission scheme 90 may be used by UE 12 to transmit over DCH 71, where transmission scheme 90 provides an additional DTX/DRX gain relative to transmission scheme 70 of FIG. 2. In particular, transmission scheme 90 differs from transmission scheme 70 (FIG. 2) in that the SRBs transmissions 82 are further discontinued when there is no voice or other data traffic on DPDCH 72. In an example, considering that SRB transmissions are very infrequent (e.g., about 1-2% transmission possibility), the SRB transmission 82 may be further decreased by UE 12 implementing transmission scheme 90. For example, if each TTI has a length of 40 ms, then SRB transmissions 82 may occur only during one 10 ms period, such as the first 10 ms, of the 40 ms TTI. In this specific example, for instance, compared with transmission scheme 70, transmission scheme 90 discontinues the transmission during the third 10 ms period of TTI 80 (and subsequent TTIs). As a result, a 75% DTX/DRX gain may be observed using transmission scheme 90 as compared to continuous transmission on DPCCH 74, thereby providing an additional power saving to UE 12 and interference reduction with respect to received signals at other devices, such as other UEs or network entities.

Returning to FIG. 1, it should be noted that while uplink processing component 31 (including signaling detecting component 40, data transmission determining component 50, and gating component 60) is described above as being part of and/or configured to operate at a UE, such as UE 12, in some aspects, uplink processing component 31 (including signaling detecting component 40, data transmission determining component 50, and gating component 60) may be a part of and/or configured to operate in a similar manner on downlink transmissions at a network entity, such as network entity 14. In an aspect, both UE 12 and network entity 14 may be configured with one or more processor(s) 30 executing a downlink processing component, having similar functionality as uplink processing component 31 but for the downlink, in order to modify transmission of control channel signaling during wireless communication in order to save transmission power and reduce interference.

Also, in an aspect, the one or more processor(s) 30 and uplink processing component 31 (including signaling detecting component 40, data transmission determining component 50, and gating component 60) may be implemented by computer-executable instructions stored in a computer-readable medium. In some aspect, the one or more processor(s) 30 and uplink processing component 31 (including signaling detecting component 40, data transmission determining component 50, and gating component 60) may be implemented in part or as a whole by one or more programmed hardware components, such as by one or more processor modules. As used herein, UE 12 may comprise a mobile apparatus and may be referred to as such throughout the present disclosure. Such a mobile apparatus or UE 12 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, a device for Internet-of-Things, or some other suitable terminology.

Additionally, as used herein, the one or more wireless nodes, including, but not limited to, network entity 14 of wireless communication system 10, may include one or more of any type of network component, such as an access point, including a base station or node B, a relay, a peer-to-peer device, an authentication, authorization and accounting (AAA) server, a mobile switching center (MSC), a radio network controller (RNC), etc. In a further aspect, the one or more wireless serving nodes of wireless communication system 10 may include one or more small cell base stations, such as, but not limited to a femtocell, picocell, microcell, or any other base station having a relatively small transmit power or relatively small coverage area as compared to a macro base station.

Figure 4:
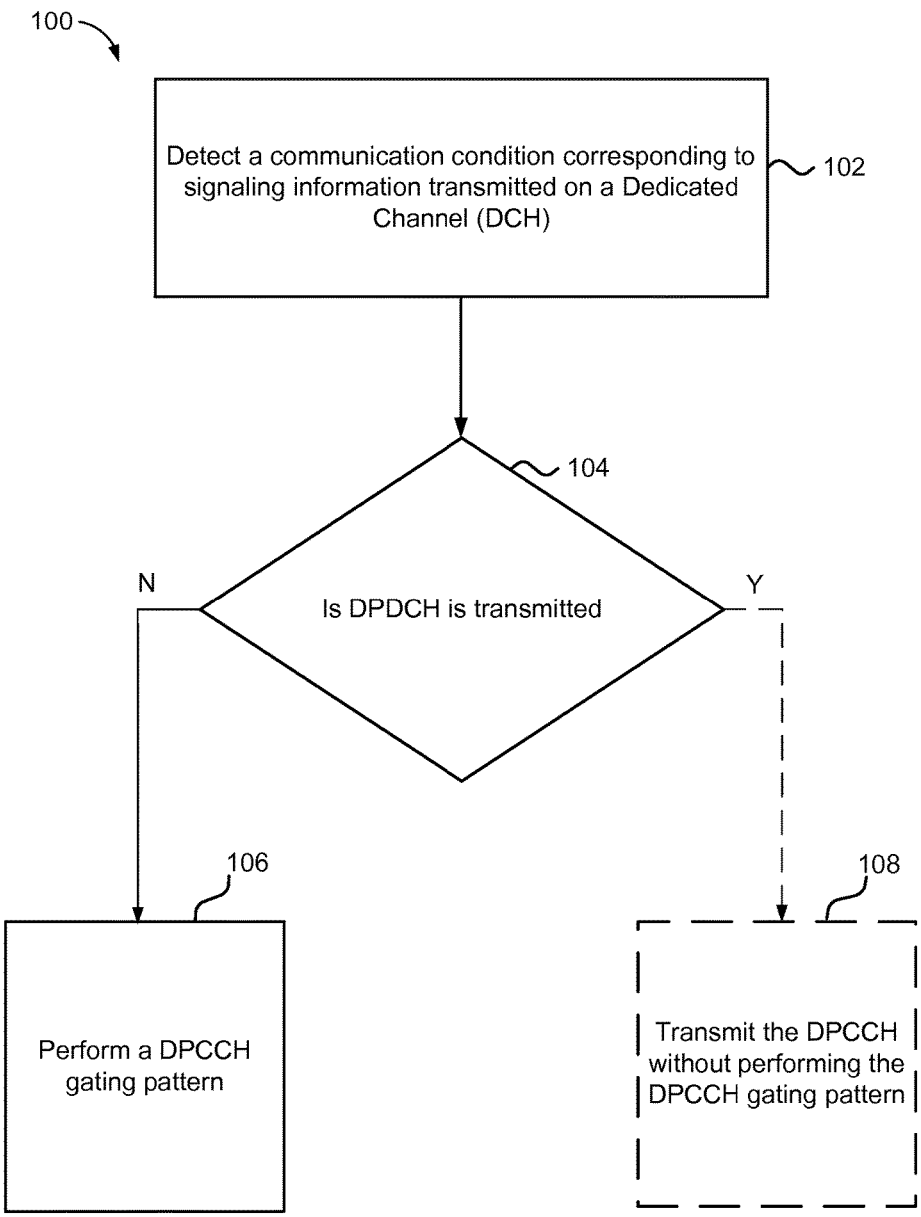
FIG. 4 is a flow diagram illustrating an exemplary method in a wireless communication system relating to the UE performing enhanced control channel signalling when only signalling information is transmitted on an uplink channel.
Figure 5:
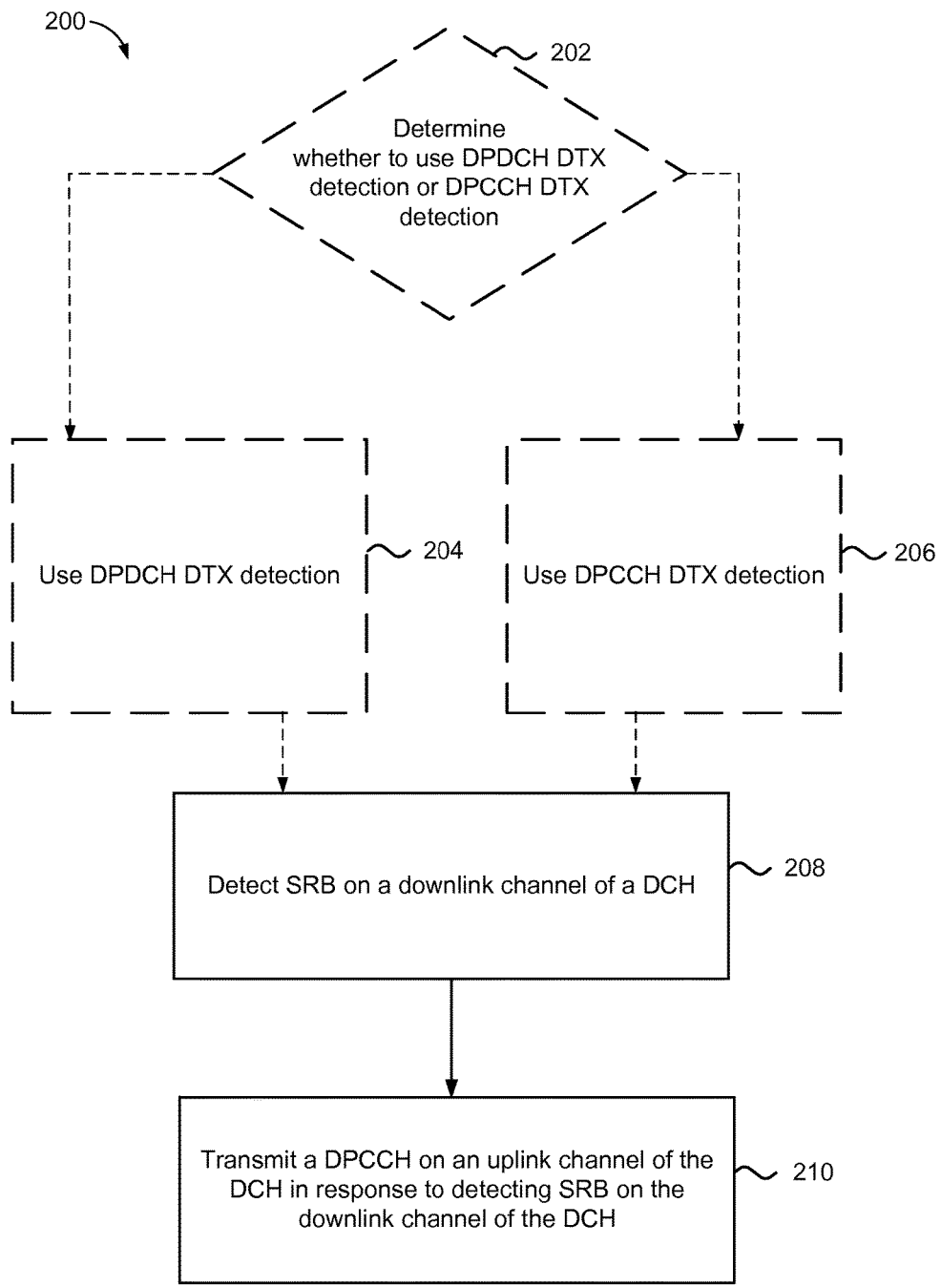
FIG. 5 is a flow diagram illustrating another exemplary method in a wireless system relating to the UE performing enhanced control channel signalling when only signalling information is transmitted on an uplink channel.
Figure 6:
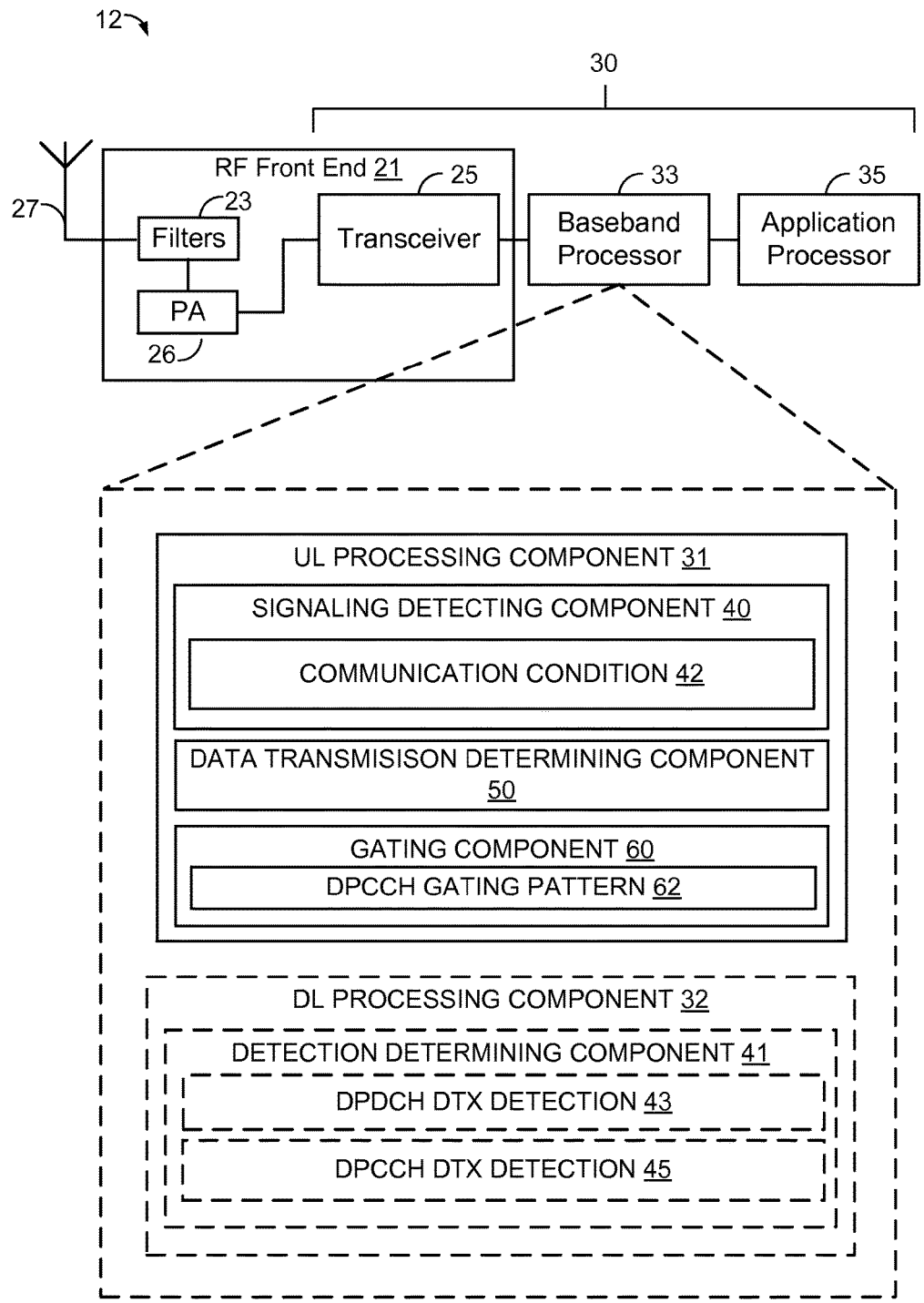
FIG. 6 is a schematic diagram illustrating a more detailed example architecture of aspects of the UE and uplink and downlink functions relating to enhanced control channel signalling as described throughout the present disclosure.

Referring to FIGS. 4, 5 and 6, an example of one or more operations (FIGS. 4 and 5) and/or an example of architectural layout and components and subcomponents (FIG. 6) of an aspect of one or more processor(s) 30 (FIG. 1) according to the present apparatus and methods are described with reference to one or more methods and one or more components that may perform the actions of these methods. Although the operations described below are presented in a particular order and/or as being performed by an example component, it should be understood that the ordering of the actions and the components performing the actions may be varied, depending on the implementation. Also, although the one or more processor(s) 30 is illustrated as having a number of subcomponents, it should be understood that one or more of the illustrated subcomponent may be separate from, but in communication with, the one or more processor(s) 30 and/or each other. Moreover, it should be understood that the following actions or components described with respect to the one or more processor(s) 30 and/or its subcomponents may be performed by a specially-programmed processor, a processor executing specially-programmed software or computer-readable media, or by any other combination of a hardware component and/or a software component specially configured for performing the described actions or components.

For instance, FIG. 4 relates to one aspect of a method 100 of modifying transmission of control channel signaling during wireless communication, while FIG. 5 relates to one aspect of a method 200 of determining whether or not SRBs are transmitted on a control communication channel 20, such as but not limited to a DPCCH. Further, FIG. 6 relates to one aspect of an implementation architecture of the components and subcomponents corresponding to the actions of method 100 (FIG. 4) and method 200 (FIG. 5). For instance, in one implementation, the one or more processors 30 of FIG. 1 may include or be included within a transceiver 25, a baseband processor 33, and an application processor 35. In an aspect, for example, each of the one or more processors 30 of FIG. 1 may be included within one or more of each of the transceivers 25, baseband processors 33, and application processors 35. As an example, baseband processor 33 may perform the digital processing for the radio signals (e.g., DCH, DPDCH, DPCCH, SRBs, etc.) transmitted and/or received by transceiver 25 and one or more antenna(s) 27, where transceiver 25 may be a multiband and/or multimode device or circuit that includes both transmitter and receiver functionality. Moreover, in an aspect, for example, transceiver 25 may be configured to receive a plurality of different types of signals, including, but not limited to, cellular, WiFi, Bluetooth, and/or global position system (GPS). A radio frequency (RF) front end 21 may connect the one or more antenna(s) 27 and transceiver 25, where RF front end 21 may include one or more multimode and/or multimode power amplifiers 26 and one or more band-specific filters 23 for processing the transmitted and/or received signal. Further, application processor 35 may be a processor for controlling user interface components or other applications being executed by UE 12. Accordingly, the aspects of uplink processing component 31 (and an optional downlink (DL) processing component 32) as described herein may be executed by the one or more processors 30 of UE 12, such as baseband processor 33.

In a particular aspect, referring to FIGS. 4 and 6, method 100 of wireless communication includes, at block 102, detecting a communication condition corresponding to signaling information transmitted on a Dedicated Channel (DCH). In an aspect, for example, one or more processor(s)

30, such as baseband processor 33, may execute UL processing component 31 (FIG. 6) and/or signaling detecting component 40 to detect a communication condition 42 corresponding to signaling information 44 transmitted on a DCH (e.g., communication channel 18 of FIG. 1). In an aspect, the communication condition 42 corresponds to a condition where signaling information 44 is transmitting on the DCH and, optionally, where there is no voice traffic present on the DCH. In certain aspects, the signaling information may comprise one or more SRBs 22. For example, UL processing component 31 (FIG. 6) and/or signaling detecting component 40 may be configured to detect whether one or more SRBs 22 are being transmitted on the DCH without voice traffic being concurrently transmitted on the DCH. In an instance, UL processing component 31 (FIG. 6) and/or signaling detecting component 40 may detect the communication condition 42 at a time of setup up of radio bearers (RBs) for the DCH.

Further, at block 104 (FIG. 4), method 100 may include determining whether a Dedicated Physical Data Channel (DPDCH) is transmitted based on detecting the communication condition. In an aspect, for example, one or more processor(s) 30, such as baseband processor 33, may execute UL processing component 31 (FIG. 6) and/or data transmission determining component 50 to determine whether data communication channel 19, e.g., a DPDCH, is transmitted based on detecting the communication condition 42. In an aspect, for example, UL processing component 31 (FIG. 6) and/or data transmission determining component 50 may be configured to determine whether one or more SRBs 22 (FIG. 1) are currently being transmitted on the DCH in order to determine whether the DPDCH is being transmitted. In an example, since the communication condition 42 corresponds to signaling information 44 being transmitted on the DCH, and the signaling information 44 may correspond to one or more SRBs 22, then UL processing component 31 (FIG. 6) and/or data transmission determining component 50 may determine whether one or more SRBs 22 (FIG. 1) are currently being transmitted on communication channels 18, e.g., the DCH. The UL processing component 31 (FIG. 6) and/or data transmission determining component 50 may base this determination on basis that when the DCH carries only SRBs, the DCH Coded Composite Transmit Channel (CCTrCH) has only two possible transport-format combinations: SRBs being transmitted or SRBs not being transmitted. As such, for example, when the SRBs 22 are not being transmitted, then UL processing component 31 (FIG. 6) and/or data transmission determining component 50 may determine that the DPDCH is not being transmitted. Otherwise, for example, when the SRBs 22 are being transmitted, then UL processing component 31 (FIG. 6) and/or data transmission determining component 50 may determine that the DPDCH is being transmitted.

At block 106 (FIG. 4), method 100 may include performing a Dedicated Physical Control Channel (DPCCH) gating pattern in response to the determination that the DPDCH is not transmitted, wherein performing the DPCCH gating pattern includes intermittently transmitting the DPCCH when one or more signaling radio bearers (SRBs) are not being transmitted. In an aspect, for example, one or more processor(s) 30, such as baseband processor 33, may execute UL processing component 31 (FIG. 6) and/or gating component 60 to perform DPCCH gating pattern 62 in response to the determination that data communication channel 19, e.g., the DPDCH, is not transmitted, wherein performing the DPCCH gating pattern 62 includes intermittently transmitting control communication channel 20, e.g., the DPCCH, when one or more SRBs 22 (FIG. 1) are not being transmitted. In an aspect, for example, UL processing component 31 (FIG. 6) and/or gating component 60 may be configured to perform discontinuous transmission (DTX) of the DPCCH during one or more transmission time intervals (TTIs) when it is determined that the DPDCH is not transmitted. Further, in an aspect, for example, performing DTX of the DPCCH during the one or more TTIs may include transmitting the DPCCH over a first portion of a SRB transmission interval. In an instance, the SRB transmission interval may be 40 milliseconds (ms) in length, and as such, the first portion may comprise the first 10 ms of the 40 ms interval. Therefore, the DPCCH may be transmitted over the first 10 ms of the 40 ms SRB transmission interval. Moreover, the DPCCH gating pattern 62 may correspond to an uplink (UL) DPCCH gating pattern, wherein information is being transmitted from the direction of a UE, such as UE 12 (FIG. 1), to a network entity, such as network entity 14 (FIG. 1). In a further aspect, the UL DPCCH gating pattern may be synchronized with a downlink (DL) DPCCH gating pattern corresponding to information be transmitted from the direction of a network entity, such as network entity 14 (FIG. 1), to a UE, such as UE 12 (FIG. 1). For example, UL processing component 31 may synchronize with DL processing component 32 in order to time-align the transmissions on both the UL and DL channels so that both channels may be power-controlled. This is due to the signal-to-interference (SIR) measurement on the UL DPCCH resulting in generation of transmit power control (TPC) commands sent on the DL DPCCH, and vice-versa. For example, in an aspect, when only one link (e.g., either UL or DL) is transmitting while the other link is DTXed, then the transmitting link may be power-control frozen. As such, synchronization of the UL DPCCH gating pattern and a DL DPCCH gating pattern maintains power control of the DCH during transmission of the one or more SRBs 22 (FIG. 1).

At block 108 (FIG. 4), method 100 may optionally include transmitting the DPCCH without performing the DPCCH gating pattern in response to the determination that the DPDCH is transmitted. In an aspect, for example, one or more processor(s) 30, such as baseband processor 33, may execute UL processing component 31 (FIG. 6) and/or gating component 60 to transmit the DPCCH without performing the DPCCH gating pattern 62 in response to the determination that the DPDCH is transmitted.

In another example of a particular aspect, referring to FIGS. 5 and 6, method 200 of wireless communication relates detecting whether SRBs are transmitted and optionally includes, at block 202, determining whether to use DPDCH DTX detection or DPCCH DTX detection. In an aspect, for example, one or more processor(s) 30, such as baseband processor 33, may execute DL processing component 32 (FIG. 6) and/or detection determining component 41 to use a DPDCH DTX detection 43 or a DPCCH DTX detection 45. For example, DPDCH DTX detection 43 operates to determine whether or not a DTX is present in the downlink of data communication channel 19, e.g., the DPDCH, in order to determine to apply a similar DPCCH gating pattern 62, e.g., to also perform a DTX, on the uplink to control communication channel 20, e.g., the DPCCH. Also, for example, DPCCH DTX detection 45 operates to determine whether or not a DPCCH is present in the downlink of control communication channel 19, e.g., the DPCCH, in order to determine to apply a similar DPCCH gating pattern 62, e.g., to also transmit DPCCH or perform a DTX, on the uplink to control communication channel 20, e.g., the DPCCH. The use of DPDCH DTX detection 43 or DPCCH DTX detection 45, for example, may be configured by the manufacturer of UE 12 or the one or more processor(s) 30, or signaled to UE 12 by the operator of the network via network entity 14. It should be noted that although DPDCH DTX detection 43 or DPCCH DTX detection 45 are described here with respect to monitoring the downlink to determine how to gate the uplink, DPDCH DTX detection 43 or DPCCH DTX detection 45 may also be similarly used on the uplink to determine how to gate the uplink, or on the downlink to determine how to gate the downlink, using the principles described herein.

In an aspect, at block 204, method 200 may optionally include using DPDCH DTX detection. In an aspect, for example, one or more processor(s) 30, such as baseband processor 33, may execute DL processing component 32 (FIG. 6) and/or detection determining component 41 to use DPDCH DTX detection mode 43. For example, since there are only two possible transport format combinations (e.g., SRBs being transmitted or not being transmitted). As such, DPDCH DTX detection mode 43 may be used to determine whether or not SRBs are being transmitted. Also, in some aspect, the use of DPDCH DTX detection mode 43 may eliminate the need for TFCI transmission, as no TFCI bits are needed if SRB is not transmitted, and thus an UL DPCCH slot format that does not have TFCI bits can be used to improve efficiency and/or to utilize more pilot bits.

In an alternative aspect, at block 206, method 200 may optionally include using DPCCH DTX detection. In an aspect, for example, one or more processor(s) 30, such as baseband processor 33, may execute DL processing component 32 (FIG. 6) and/or detection determining component 41 to use DPCCH DTX detection 45. For example, the gating pattern 62 may comprise DTX in the first and last few slots of every SRB TTI. The DPCCH may be transmitted during the SRB transmission in addition to a few slots prior to and immediately after the SRB transmission in order to serve as preamble and postamble for channel estimation and power-control. As such, detection of DPCCH in the preamble slots serves as an indication that SRB 22 may be transmitted in the next SRB TTI.

In further aspect, at block 208, method 200 may include detecting SRB on a downlink channel of a DCH. In an aspect, for example, one or more processor(s) 30 may execute DL processing component 32 (FIG. 6) and/or detection determining component 41 to detect one or more SRBs 22 on the DL channel of a DCH. In an instance, DL processing component 32 (FIG. 6) and/or detection determining component 41 may detect one or more SRBs 22 on the DL channel of a DCH based on implementing DPDCH DTX detection 43 or DPCCH DTX detection 45, as described above.

In an aspect, at block 210, method 200 may include transmitting a DPCCH on an uplink channel of the DCH in response to detecting SRB on the downlink channel of the DCH. In an aspect, for example, one or more processor(s) 30, such as baseband processor 33, may execute DL processing component 32 (FIG. 6) and/or RF front end 21 and antenna 27 to transmit control communication channel 20, e.g., a DPCCH, on the uplink of the DCH in response to detecting SRB 22 on the downlink channel of the DCH. As such, transmission of the DPCCH on the uplink channel of the DCH maintains power control of the DCH during transmission of the one or more SRBs 22.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of modifying transmission of control channel signaling during wireless communication, comprising:
    detecting, at a user equipment (UE), a communication condition corresponding to only signaling information being transmitted on a Dedicated Channel (DCH);
    determining, by the UE, whether a Dedicated Physical Data Channel (DPDCH) is transmitted based on detecting the communication condition, wherein determining whether the DPDCH is transmitted includes determining whether one or more signaling radio bearers (SRBs) are being transmitted; and
    performing, by the UE, a Dedicated Physical Control Channel (DPCCH) gating pattern in response to the determination that the DPDCH is not transmitted, wherein performing the DPCCH gating pattern includes intermittently transmitting the DPCCH when the one or more SRBs are not transmitted, wherein intermittently transmitting the DPCCH when the one or more SRBs are not transmitted further includes performing discontinuous transmission (DTX) of the DPCCH for a majority portion for each one or more transmission time intervals (TTIs).

2. The method of claim 1, wherein performing DTX of the DPCCH during the one or more TTIs further comprises transmitting the DPCCH over a first portion of a SRB transmission interval.

3. The method of claim 1, wherein the DPCCH gating pattern corresponds to an uplink (UL) DPCCH gating pattern.

4. The method of claim 1, wherein the DPCCH gating pattern corresponds to an downlink (DL) DPCCH gating pattern.

5. The method of claim 1, further comprising transmitting the DPCCH without performing the DPCCH gating pattern in response to the determination that the DPDCH is transmitted.

6. The method of claim 1, wherein the communication condition corresponds to a condition where only the SRBs are being transmitted on the DCH without voice information.

7. The method of claim 1, wherein detecting the communication condition occurs at a time of setting up radio bearers for the DCH.

8. An apparatus for modifying transmission of control channel signaling during wireless communication, comprising:
    means for detecting, at a user equipment (UE), a communication condition corresponding to only signaling information being transmitted on a Dedicated Channel (DCH);
    means for determining, by the UE, whether a Dedicated Physical Data Channel (DPDCH) is transmitted based on detecting the communication condition, wherein the means for determining whether the DPDCH is transmitted includes means for determining whether one or more signaling radio bearers (SRBs) are being transmitted; and
    means for performing, by the UE, a Dedicated Physical Control Channel (DPCCH) gating pattern in response to the determination that the DPDCH is not transmitted, wherein performing the DPCCH gating pattern includes intermittently transmitting the DPCCH when one or more SRBs are not transmitted, wherein means for intermittently transmitting the DPCCH when the one or more SRBs are not transmitted further includes means for performing discontinuous transmission (DTX) of the DPCCH for a majority portion for each one or more transmission time intervals (TTIs).

9. The apparatus of claim 8, wherein means for performing DTX of the DPCCH during the one or more TTIs further comprises means for transmitting the DPCCH over a first portion of a SRB transmission interval.

10. The apparatus of claim 9, wherein the DPCCH gating pattern corresponds to an uplink (UL) DPCCH gating pattern.

11. The apparatus of claim 9, wherein the DPCCH gating pattern corresponds to an downlink (DL) DPCCH gating pattern.

12. The apparatus of claim 9, wherein the means for performing further comprises means for transmitting the DPCCH without performing the DPCCH gating pattern in response to the determination that the DPDCH is transmitted.

13. The apparatus of claim 9, wherein the communication condition corresponds to a condition where only the SRBs are being transmitted on the DCH without voice information.

14. An apparatus for modifying transmission of control channel signaling during wireless communication, comprising:
    a memory; and
    a processor in communication with the memory, wherein the processor is configured to:
        detect, at a user equipment (UE), a communication condition corresponding to only signaling information being transmitted on a Dedicated Channel (DCH);
        determine, by the UE, whether a Dedicated Physical Data Channel (DPDCH) is transmitted based on detecting the communication condition, wherein the processor configured to determine whether the DPDCH is transmitted is further configured to determine whether one or more signaling radio bearers (SRBs) are currently being transmitted; and
        perform, by the UE, a Dedicated Physical Control Channel (DPCCH) gating pattern in response to the determination that the DPDCH is not transmitted, wherein the processor is further configured to:
            intermittently transmit the DPCCH when one or more SRBs are not transmitted by performing discontinuous transmission (DTX) of the DPCCH for a majority portion for each one or more transmission time intervals (TTIs).

15. The apparatus of claim 14, wherein the processor is further configured to transmit the DPCCH over a first portion of a SRB transmission interval.

16. The apparatus of claim 14, wherein the DPCCH gating pattern corresponds to an uplink (UL) DPCCH gating pattern.

17. The apparatus of claim 14, wherein the DPCCH gating pattern corresponds to an downlink (DL) DPCCH gating pattern.

18. The apparatus of claim 14, wherein the processor is further configured to transmit the DPCCH without performing the DPCCH gating pattern in response to the determination that the DPDCH is transmitted.

19. The apparatus of claim 14, wherein the communication condition corresponds to a condition where only the SRBs are being transmitted on the DCH without voice information.

20. The apparatus of claim 14, wherein the processor is further configured to detect the communication condition at a time of setting up radio bearers for the DCH.

21. A non-transitory computer-readable medium storing executable code for modifying transmission of control channel signaling during wireless communication, comprising:
   code for detecting, at a user equipment (UE), a communication condition corresponding to only signaling information being transmitted on a Dedicated Channel (DCH);
   code for determining, by the UE, whether a Dedicated Physical Data Channel (DPDCH) is transmitted based on detecting the communication condition, wherein the code for determining whether the DPDCH is transmitted includes code for determining whether one or more signaling radio bearers (SRBs) are being transmitted; and
   code for performing, by the UE, a Dedicated Physical Control Channel (DPCCH) gating pattern in response to the determination that the DPDCH is not transmitted, wherein code for performing the DPCCH gating pattern includes code for intermittently transmitting the DPCCH when one or more SRBs are not transmitted, wherein code for intermittently transmitting the DPCCH when the one or more SRBs are not transmitted further includes code for performing discontinuous transmission (DTX) of the DPCCH for a majority portion for each one or more transmission time intervals (TTIs).

22. The computer-readable medium of claim 21, wherein code for performing DTX of the DPCCH during the one or more TTIs further comprises code for transmitting the DPCCH over a first portion of a SRB transmission interval.

23. The computer-readable medium of claim 21, wherein the DPCCH gating pattern corresponds to an uplink (UL) DPCCH gating pattern.

24. The computer-readable medium of claim 21, wherein the code for performing further comprises code for transmitting the DPCCH without performing the DPCCH gating pattern in response to the determination that the DPDCH is transmitted.

25. The computer-readable medium of claim 21, wherein the communication condition corresponds to a condition where only the SRBs are being transmitted on the DCH without voice information.

* * * * *